May 18, 1954   G. F. MYERS   2,678,783
CONVERTIBLE AIRCRAFT
Original Filed April 15, 1940

Inventor:
George Francis Myers.

Patented May 18, 1954

2,678,783

UNITED STATES PATENT OFFICE 2,678,783

CONVERTIBLE AIRCRAFT

George Francis Myers, New York, N. Y.

Original application April 15, 1940, Serial No. 329,620. Divided and this application December 15, 1945, Serial No. 635,141

4 Claims. (Cl. 244—7)

The invention relates to aircraft and particularly to that class thereof called direct lift machines, or helicopters, or rotary wing machines, or convertibles.

It has for its object to produce a flying machine having all of the good characteristics and performance of the airplane, combined with all of the good characteristics and performance of the helicopter.

Still another object is to produce aircraft capable of both vertical and horizontal flight, the craft being able to land on its rear end when coming down to earth in the vertical direction like a helicopter; or it can land in a more or less horizontal attitude like an airplane with its elongated housing standing on the ground in an inclined position.

Still another object is to produce an aircraft having two propellers with parallel axes at a substantial distance apart, the two axes being also co-parallel with the axis of the housing means, which holds the motive power to drive the propeller means.

With these and other objects in view the invention consists in the novel construction, combination and arrangement of parts as hereinafter fully described, illustrated and claimed.

In the accompanying drawings, in which similar numerals of reference denote similar parts throughout the several views.

Figure 1:
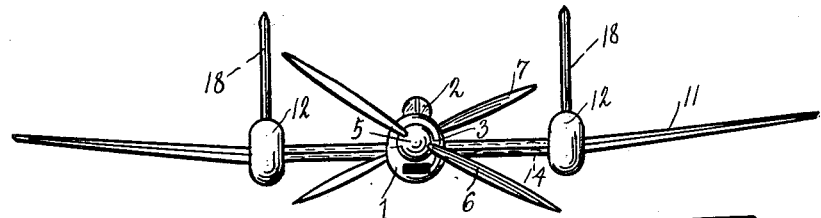
Figure 1 is a front elevation of the preferred embodiment of the invention.
Figure 2:
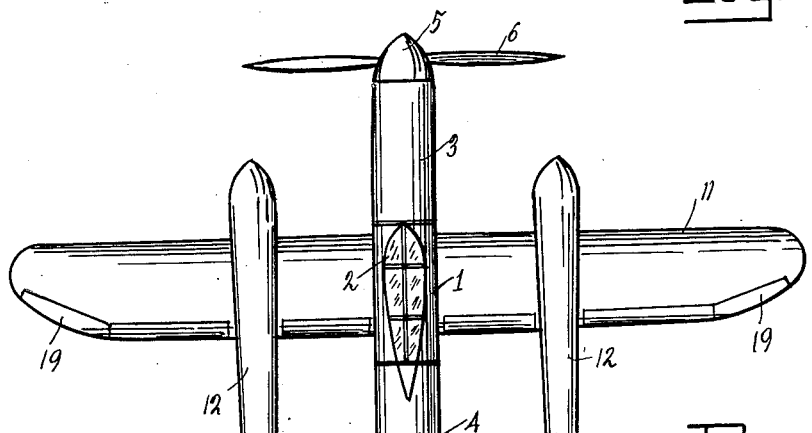
Fig. 2 is a plan view of the first figure.

Both machines are capable of landing either in a vertical attitude or in a horizontal position.

The invention is constructed and operated substantially and preferably as follows:

1 designates the housing means in the central portion of which is the cabin 2 containing the operation compartment; 3 is the cover over the forward engine. These engines drive the forward propeller means 6 and the after or rear propeller means 7, each propeller means being equipped with a spinner 5; the propeller means rotating oppositely and having variable pitch.

11 are the wings, mounted on each side of the housing means 2 and 12, and support the tail unit which comprises the stabilizing plane 13, the elevator 14 and the rudder 18; the ailerons 19 are shown in their usual place. 4 is the cover over the rear or after engine.

Figure 4:
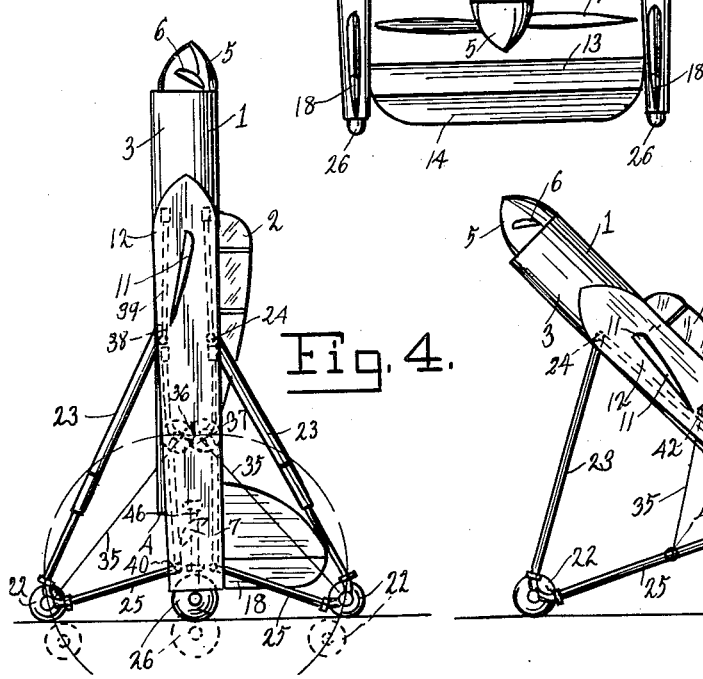
Fig. 4 is another side elevation of a modification of the machine, in which the housing means of the machine is resting on the ground in a substantially upright or vertical position or attitude.
Figure 3:
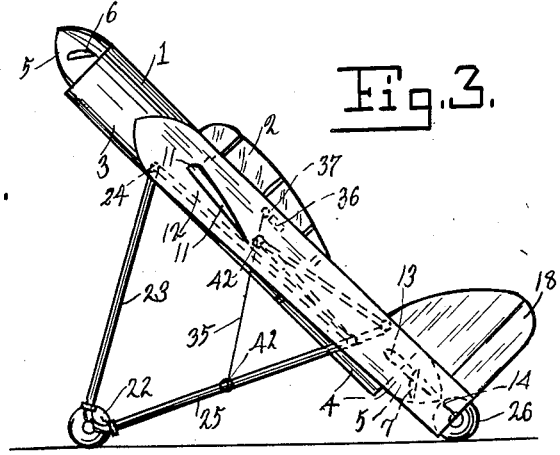
Fig. 3 is a side elevation of the machine showing it resting on the ground at an angle to the horizon of about forty-five degrees.

In Fig. 3 as well as in Fig. 4, 22 is the landing wheel on brace 23 hinged at 24 to the housing means and to the second brace 25 which is also hinged to the housing means. In Fig. 3 the brace 23 is in one piece while in Fig. 4 the brace 23 is made telescopic. The brace 25 in Fig. 4 is in one piece, while in Fig. 3 the brace 25 is made in two pieces and a hinged joint 42 is inserted between the two pieces; when it is desired to retract the landing gear 22 the core or cable 35 is wound up on the drum 37 driven by the servomotor 36 which pulls the two pieces apart, or breaks the hinge at 42 and the brace breaks in two and the wheel is easily retracted into the housing means as shown in said Fig. 3. In Fig. 4 the upper part 38 of the brace 23 when retracted slides up and down the guide 39. As the braces are oleo-struts they will be automatically locked when they are in their projected positions on the ground. The tail-end wheel 26 has its dashpot mechanism or actuator 46 fashioned to cushion or ease the shock of landing.

The pilot seats himself in his chair in the cabin, the chair may be hinged or pivoted if desired, and after seeing that the controls and his engines are working perfectly, he changes the angle of incidence of his propeller blades to a zero or slightly negative angle of incidence or pitch and speeds up his propeller means to a high number of revolutions per minute. This will tend to push the machine toward the ground and prevent that wobbling or weaving of the machine which might turn it over on its side when it is only partly airborne.

When everything is ready the pilot quickly changes the blades from their negative angle to a positive angle of incidence and the machine wil jump off the ground into the air.

The pilot immediately operates his elevator and soon will be in horizontal flight; after which the operation of the machine is exactly the same as that of a conventional airplane.

When the pilot is ready to land, he comes as near the ground as convenient with his engines idling, and then preferably zooms, or travels perpendicularly into the air, and then lowers himself slowly to earth. If for any reason he had overflown his place of landing while coming down vertically he materially slows down one engine and by the torque of the other he can turn around in mid-air and fly the other way to his landing place. If a wind is blowing against him while landing vertically he tips his machine over toward the wind more or less, to counteract the force thereof.

When landing horizontally at an airport or on a flying field the machine will land just like an ordinary airplane, only remembering to bring the machine to rest at a 45° or 90° angle instead of the customary angle of about 17°. If one or both of the engines should stop while flying in the horizontal position, the pilot manipulates his controls in exactly the same manner as he would an airplane.

As the invention is in some of its aspects generic, I do not limit myself to the particular construction shown or described, but also contemplate the employment of such equivalents as fairly fall within the scope of the claims.

In this connection it should be stated: that the machine, and the modification thereof, comprises an aircraft the attitude of whose elongated housing means is preferably substantially vertical during vertical flight, and substantially horizontal during horizontal flight; however, the attitude of the housing means in Fig. 3 will be inclined more or less, the attitude of the housing means of the machine in Fig. 4 will be preferably upright or perpendicular, or nearly so; although wheels are shown for earth engaging means, spikes or the like may be used; instead of the housing means being built up of three members, cabin and booms, it need comprise but two or one member only, and the members may have parallel sides; just prior to landing, the braces or struts may be pushed out of the housing means from their retracted or inactive positions by pushers or by other procedure (not shown), or by gravity; the diameters of the propellers or propeller means may be of any size or form.

This application is a division of my companion application filed April 15, 1940, and serially numbered 329,620.

Therefore it should be understood that I may make various changes in the form, proportion, size and detail of the several parts shown, the number and position of certain elements used, as well as the character of the motive power employed, without departing from the spirit of the invention.

I claim:

1. A heavier than air craft having an elongated fuselage that is adapted to be sustained in flight with the axis thereof arranged vertically or substantially horizontally, a pair of oppositely rotatable power driven axially spaced propellers having their axes of rotation arranged substantially co-axial with said axis of the fuselage, each of said propellers comprising a plurality of blades, all of the blades of both said propellers being of substantially the same form and being variable in pitch, one of said propellers being mounted adjacent the front of said fuselage, and the other of said propellers being spaced rearwardly therefrom a substantial distance, said propellers and the load of the craft being disposed and arranged so that the center of gravity of said craft is located between said propellers, and adjustable means adjacent one end of said fuselage for controlling and directing the flight of the craft.

2. A heavier than air craft having an elongated fuselage that is adapted to be sustained in flight with the axis thereof arranged vertically or substantially horizontally, a pair of oppositely rotatable power driven propellers having their axes of rotation arranged substantially co-axial with said axis of the fuselage, each of said propellers comprising a plurality of blades, all of the blades of both said propellers being of substantially the same form and being variable in pitch, said propellers being adapted to be driven with the pitch thereof set so that the torque re-action of one of said propellers on the fuselage substantially balances the torque re-action of the other of said propellers on the fuselage, one of said propellers being mounted adjacent the front of said fuselage and the other of said propellers being spaced rearwardly therefrom a substantial distance, said propellers and the load of the craft being disposed and arranged so that the center of gravity of said craft is located between said propellers, and fin means adjacent one end of said fuselage for stabilizing and controlling the flight of the craft.

3. A heavier than air craft having an elongated fuselage that is adapted to be sustained in flight with the axis thereof arranged vertically or substantially horizontally, a pair of oppositely rotatable power driven propellers having their axes of rotation arranged substantially co-axial with said axis of the fuselage, each of said propellers comprising a plurality of blades, all of the blades of both said propellers being of substantially the same form and being variable in pitch, to produce a slow screw for vertical take-off and a fast screw for horizontal flight, one of said propellers being mounted adjacent the front of said fuselage and the other of said propellers being spaced rearwardly therefrom a substantial distance, said propellers and the load of the craft being disposed and arranged so that the center of gravity of said craft is located between said propellers, and fin means adjacent one end of said fuselage for stabilizing and controlling the flight of the craft.

4. A heavier than air craft capable of both vertical and horizontal flight and having an elongated fuselage, power driven propeller means rotatable about an axis substantially coinciding with the axis of said fuselage, said axis being substantially vertical during vertical flight and substantially horizontal during horizontal flight, landing gear at the tail of the fuselage and capable of supporting the fuselage in upright position on the ground, said propeller means being mounted on said fuselage at a point adjacent said landing gear and rearward of the center of gravity of the craft, wing means projecting from said fuselage at a point forward of said propeller means, and additional propeller means for counteracting the torque.

References Cited in the file of this patent

UNITED STATES PATENTS

| Number | Name | Date |
|---|---|---|
| 1,538,801 | Hall | May 19, 1925 |
| 1,686,080 | Ford | Oct. 2, 1928 |
| 1,786,545 | Noeggerath | Dec. 30, 1930 |
| 1,875,267 | Savoja | Aug. 30, 1932 |
| 1,914,092 | Henrichsen | June 13, 1933 |
| 1,916,092 | Bleriot | June 27, 1933 |
| 2,140,783 | Bellanca | Dec. 20, 1938 |

FOREIGN PATENTS

| Number | Country | Date |
|---|---|---|
| 468,063 | Great Britain | June 23, 1937 |